United States Patent [19]

Poos

[11] 3,725,435
[45] Apr. 3, 1973

[54] 2-IMINO-PYRROLIDINES
[75] Inventor: George Ireland Poos, Ambler, Pa.
[73] Assignee: McNeil Laboratories, Inc., Fort Washington, Pa.
[22] Filed: Nov. 5, 1970
[21] Appl. No.: 87,324

Related U.S. Application Data

[63] Continuation-in-part of Ser. No. 738,379, June 17, 1968, abandoned, which is a continuation-in-part of Ser. No. 649,812, June 29, 1967, abandoned, which is a continuation-in-part of Ser. No. 409,563, Nov. 6, 1964, abandoned.

[52] U.S. Cl....................260/326.5 D, 260/326.5 M, 260/326.85, 424/274
[51] Int. Cl. .............................................C07d 27/04
[58] Field of Search ..................260/326.85, 326.5 M

[56] References Cited

UNITED STATES PATENTS 3,121,093   2/1964   Bortnick et al................260/326.9 X

OTHER PUBLICATIONS

Brederick et al. Berichte, Vol. 94 (1961) p. 2278–2281, 2289.

*Primary Examiner*—Alex Mazel
*Assistant Examiner*—Joseph A. Narcavage
*Attorney*—Salvatore R. Conte, Herbert I. Sherman and Robert L. Minier

[57] ABSTRACT

The compounds are of the class of 2-imino-pyrrolidines which are useful for their anti-inflammatory and ganglionic blocking activities, and their effect on blood pressure and heart rate.

21 Claims, No Drawings

2-IMINO-PYRROLIDINES

This is a continuation-in-part application of my copending application Ser. No. 738,379, filed June 17, 1968, now abandoned, which in turn is a continuation-in-part of application Ser. No. 649,812, filed June 29, 1967, now abandoned, which in turn is a continuation-in-part of application Ser. No. 409,563, filed Nov. 6, 1964, now abandoned.

This invention relates to new chemical compounds and the preparation thereof. More particularly, this invention relates to novel 1-(lower alkyl)-2-aralkylimino-pyrrolidines of the formula:

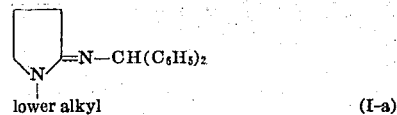

and 1-(lower alkyl)-2-aralkylimino-pyrrolidines of the formula:

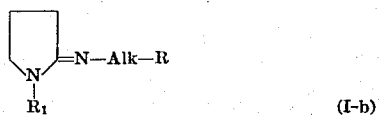

in which Alk represents a saturated straight or branched chain alkylene having from one to three carbon atoms, preferably 2; R represents a member selected from the group consisting of mono-, di- and tri-substituted phenyl and methylenedioxyphenyl; and $R_1$ is lower alkyl. The therapeutically active non-toxic acid addition salts of the foregoing compounds are also embraced within the scope of this invention.

As used herein, "lower alkyl" may be straight or branch chained and have from one to eight carbon atoms, such as, for example, methyl, ethyl, propyl, isopropyl, butyl, tertbutyl, pentyl, hexyl, heptyl, octyl and the like; and "substituted phenyl" means a phenyl having one or more of the following substituents attached to it, lower alkoxy, hydroxy and halo, the preferred substituents being lower alkoxy and halo, more preferably, chloro. When more than one substituent is present on said phenyl, they may be the same or different.

The novel compounds of this invention have several useful pharmacological properties which make them suitable for pharmaceutical application. For example, the compounds of formula (I-a) possess anti-inflammatory activity, as exemplified by 1-methyl-2-[(1,1-diphenylmethyl)imino]-pyrrolidine, which has been observed to produce about a 66 percent inhibition in the standard kaolin-induced rat paw edema assay after a 100 mg/kg oral dose. In addition, the compounds of formula (I-a) possess central nervous system depressant activity. With the compounds of formula (I-b), wherein R is hydroxy-substituted phenyl, hypotensive and cardiac stimulating activity in anesthetized dogs is observed at doses of about 10 mg/kg i.v. When R is halo-substituted phenyl, or when alk-R is dialkoxybenzyl, administration of about 1-16 mg/kg i.v. to an anesthetized dog elicits about a 30-40 mm. Hg. rise in arterial blood pressure, indicating pressor activity. Local anesthetic activity is observed with the formula (I-b) compounds wherein -Alk-R is dihalobenzyl, as demonstrated by the application of a 2 percent solution to the superior cervical nerve in the cat. In addition, ganglion blocking activity is specifically observed with those compounds within formula (I-b) wherein -Alk-R is dihalophenethyl at doses of about 10–20 mg/kg i.v. in anesthetized dogs. With the formula (I-b) compounds in which R is lower alkoxy or methylenedioxy substituted phenyl, a decrease in the heart rate has been found upon i.v. administration to anesthetized dogs without reducing cardiac output or the mechanical work of the heart at doses ranging from about 2.5–10.0 mg/kg. As an example, such effects have been observed upon i.v. administration of 1-methyl-2-[(3,4-dimethoxy-phenethyl)imino]-pyrrolidine at a dose of 2.5–5.0 mg/kg. In view of the foregoing, the subject compounds may be formulated into pharmaceutical dosage forms and preparations according to conventional means for, inter alia, oral and parenteral administration.

The subject compounds may be prepared by reacting a fluoborate of formula (II) with a primary amine (III) having the formula $NH_2-Z$, wherein $-Z$ is $-CH(C_6H_5)_2$ for compounds of formula (I-a) and -Alk-R for compounds of formula (I-b). Stoichiometric quantities of reactants are preferably employed. The starting material II may be prepared according to Ber., 89, 2063 (1956). Suitable organic solvents for conducting the reaction include lower aliphatic alcohols, such as, for example, methanol, ethanol, 2-propanol, tert-butanol and the like; ethers, such as, for example, diethylether, tetrahydrofuran, dioxane and the like; lower halogenated hydrocarbons such as chloroform, methylene chloride, 1,2-dichloroethane and the like; and aromatic hydrocarbons such as benzene, toluene, xylene and the like. Elevated temperatures may be advantageously employed during the reaction. The resulting product (IV), in the form of the fluoborate salt, is converted to the corresponding base form (I) by conventional means, for example, by treatment with a suitable alkali such as alkali metal or alkaline earth metal hydroxides, carbonates and the like. The reactions may be illustrated as follows:

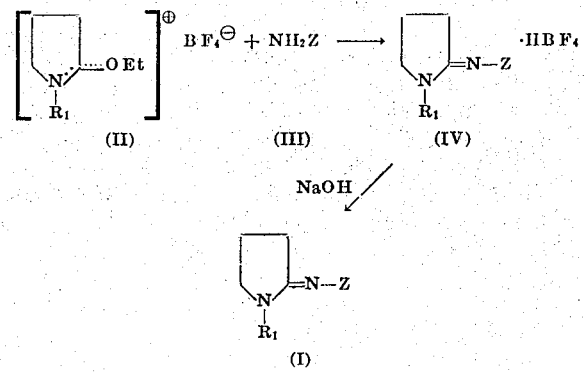

The preferred method of making the 1-$R_1$-2-[(hydroxy-phenyl-Alk)imino]-pyrrolidines of formula (I-b) consists in conventional hydrolysis of the alkoxy function in the corre-sponding 1-$R_1$-2-[(lower alkoxyphenyl-Alk)imino]-pyrrolidines, for example, by refluxing the latter for several hours in glacial acetic acid and hydrobromic acid. In turn, conventional O-alkylation of the hydroxy function, for example, by treatment with an appropriate lower alkyl halide alkylating agent in alcohol under reflux, provides the corresponding 1-$R_1$-2-[(lower alkoxyphenyl-Alk)imino]-pyrrolidines of formula (I-b).

Alternatively, the subject compounds of formula (I-b) may be prepared by reacting a 1-$R_1$-pyrrolidine-2-one lower alkyl acetal [see Annalen, 641, 1 (1961) for the general method of preparing this type of starting material], a 1-$R_1$-2-lower alkylthiopyrrolidinium salt such as, for example, 1-lower alkyl-2-methylthiopyrrolidinium methosulfate [see Annalen, 651, 89 (1962) for the general method of preparing this type of starting material], or the phosphorous oxychloride adduct or chloride prepared from a 1-$R_1$-pyrrolidine-2-one [see Berichte, 94, 2278 (1961) and Berichte, 96, 2671 (1963) for the general method of preparing these types of starting materials] with the primary amine (III) having the formula $NH_2$-Z. The reactants are preferably mixed in stoichiometric amounts, either without solvent if the amine is a liquid or with a suitable organic solvent. Elevated temperatures may be advantageously employed during these reactions. The products, when obtained as salts, may be converted to the corresponding base form (I) as described previously.

The subject compounds may be isolated as the free bases by synthetic processes normally employed. These compounds, in base form, are convertible to therapeutically active nontoxic acid addition salts by treatment with an appropriate acid, such as, for example, an inorganic acid such as, hydrohalic acid, e.g., hydrochloric, hydrobromic, hydroiodic acid; sulfuric or nitric acid; a phosphoric acid; an organic acid, such as, acetic, propionic, glycolic, lactic, pyruvic, malonic, succinic, maleic, fumaric, malic, tartaric, citric, benzoic, cinnamic, mandelic, methanesulfonic, ethane-sulfonic, hydroxyethanesulfonic, benzenesulfonic, p-toluenesulfonic, cyclohexanesulfamic, salicylic, p-aminosalicylic, 2-phenoxybenzoic, or 2-acetoxybenzoic acid. Conversely, the salt form can be converted in the usual manner into the free base.

The invention may be illustrated by, although not limited to, the following examples.

EXAMPLE I

1-Methyl-2-[(1,1-diphenylmethyl)imino]-pyrrolidine 21.5 Grams (0.1 mole) of 1-methyl-2-ethoxypyrrolidinium fluoroborate are added to 18.3 grams (0.1 mole) of benzhydrylamine (exothermic reaction). The mixture is heated an additional 15 minutes on a steam cone and then cooled. Ether is added and the crystalline salt collected by filtration. The salt is suspended in water and the mixture made basic with sodium hydroxide solution. The resulting product is extracted into methylene chloride. The extracts are washed once with water, dried over magnesium sulfate, filtered and concentrated in vacuo. The crude crystalline product is slurried in petroleum ether and collected by filtration; m.p. 107°–114°C. Recrystallization from methylene chloride-petroleum ether affords pure 1-methyl-2-[(1,1-diphenylmethyl)imino]-pyrrolidine, m.p., 112°–113°C.

EXAMPLE II

The procedure of Example I is followed, except that equivalent quantities of the 1-ethyl and 1-butyl derivatives of 2-ethoxypyrrolidinium fluoroborate are respectively utilized in lieu of the 1-methyl-2-ethoxypyrrolidinium fluoroborate used therein to yield as products: 1-ethyl-2-[(1,1-diphenylmethyl)imino]-pyrrolidine and 1-butyl-2-[(1,1-diphenylmethyl)imino]-pyrrolidine, respectively.

EXAMPLE III

Treatment of the 1-methyl, 1-ethyl and 1-butyl derivatives of 2-[(1,1-diphenylmethyl)imino]-pyrrolidine obtained from Examples I and II with mineral acids such as hydrochloric acid and hydrobromic acid afford the corresponding acid addition salts thereof.

EXAMPLE IV

1-Methyl-2-(p-chlorobenzylimino)pyrrolidine

To 20 grams (0.09 mole) of 1-methyl-2-ethoxy-pyrrolidinium fluoborate is added 14.2 grams (0.1 mole) of p-chlorobenzylamine. After the initial reaction subsides, the mixture is heated on a steam cone for 10 minutes and then cooled. The oily product is washed 3 times with ether, dissolved in methylene chloride, washed 3 times with 10 percent sodium hydroxide, dried over magnesium sulfate, filtered and concentrated in vacuo (yield, 21.6 grams). The oily residue of crude 1-methyl-2-(p-chlorobenzylimino)-pyrrolidine is dissolved in acetone and treated with 18 grams of cyclohexanesulfamic acid in acetone. The crystalline product is collected by filtration and recrystallized from acetone to give 30 grams (73.5 percent) of 1-methyl-2-(p-chlorobenzylimino)pyrrolidine cyclohexanesulfamate, m.p. 142°–143°C.

EXAMPLE V

The procedure of Example IV is followed, except that an equivalent quantity of p-fluorobenzylamine is utilized in lieu of the p-chlorobenzylamine used therein to yield as the respective products: 1-methyl-2-(p-fluorobenzylimino)-pyrrolidine and the corresponding cyclohexanesulfamate salt.

EXAMPLE VI

1-Methyl-2-[(3,4-dimethoxyphenethyl)imino]pyrrolidine

To 20 grams of 1-methyl-2-ethoxypyrrolidinium fluoroborate is added 18.1 grams (0.01 mole) of β-(3,4-dimethoxyphenyl)-ethylamine. After the initial reaction subsides, the mixture is heated for 10 minutes on a steam cone. The mixture is cooled and the crystals are slurried in ether and collected. The solid is slurried in water and the mixture is made basic with 10 percent sodium hydroxide and extracted with methylene chloride. The extracts are dried over magnesium sulfate, filtered and concentrated in vacuo, yielding 30 grams of crude oily 1-methyl- 2-[(3,4-dimethoxyphenethyl)imino]pyrrolidine. Column chromatography over basic alumina affords 20 grams of material from the ether eluates. Distillation of this material gives 10 grams of 1-methyl-2-[(3,4-dimethoxyphenethyl)imino]pyrrolidine (b.p. 161°–169°C./0.35 mm.), which is dissolved in acetone and treated with 7.1 grams (0.04 mole) of cyclohexanesulfamic acid in acetone. When crystallization is complete, the material is filtered, yielding 1-methyl-2-[(3,4-dimethoxyphenethyl)imino]-pyrrolidine cyclohexanesulfamate, m.p. 128°–130.5°C.

EXAMPLE VII

2-[(3',4'-Dimethoxyphenethyl)imino]-1-ethyl-pyrrolidine perchlorate

Triethyloxonium fluoborate is prepared from 11.25 g. (0.08 mole) of boron trifluoride etherate and 5.55 g. (0.06 mole) of epichlorohydrin in ether. The salt is washed with ether by decantation and treated with an ether solution of 6.8 g. (0.06 mole) of 1-ethyl-2-pyrrolidone. After stirring at room temperature for 4 hours, the oily salt is washed with ether by decantation, dissolved in methylene chloride and treated with a solution of 9.06 g. (0.05 mole) of α-(3,4-dimethoxyphenyl)ethyl-amine. After stirring at room temperature for 17 hours, the reaction mixture is washed with dilute sodium hydroxide, dried over anhydrous magnesium sulfate, filtered and concentrated in vacuo, yielding about 15 g. of crude oily 2-[(3',4'-dimethoxyphenethyl)imino]-1-ethyl-pyrrolidine which is distilled. The desired fraction distills at 140°-155° C./0.25 mm. Hg. The thus-obtained 2-[(3',4'-dimethoxyphenethyl)imino]-1-ethyl-pyrrolidine is dissolved in ethanol and treated with an ethanolic solution of 5.25 g. of perchloric acid in ethanol. Dilution with ether yields crystals of 2-[(3',4'-dimethoxyphenethylOimino]-1-ethyl-pyrrolidine perchlorate, which are collected by filtration, washed with ether and air-dried to give the pure perchlorate, m.p. 102°-104.5° C.

Analysis: Calcd. for $C_{16}H_{24}N_2O_2 \cdot HClO_4$: C, 50.99; H, 6.69; N, 7.44; Cl, 9.41%
Found: C, 51.10; H, 6.72; N, 7.41; Cl, 9.46%

EXAMPLE VIII

The procedure of Example VII is repeated, except that an equivalent quantity of an appropriate amine, i.e., "NH$_2$Z," is used in place of the β-(3,4-dimethoxyphenyl)-ethylamine used therein to yield, as respective products, the following imino-pyrrolidines, both in base form and as the corresponding perchlorate salt:
2-(p-bromobenzyl)imino-1-ethyl-pyrrolidine;
2-(2,4-di-methoxyphenethyl)imino-1-ethyl-pyrrolidine;
2-(p-chlorobenzyl)imino-1-ethyl-pyrrolidine;
2-(3,4-di-ethoxybenzyl)imino-1-ethyl-pyrrolidine;
2-(3,4,5-tri-methoxyphenethyl)imino-1-ethyl-pyrrolidine;
2-(3,4,5-tri-methoxybenzyl)imino-1-ethyl-pyrrolidine;
2-(2,4,6-tri-chloro-phenethyl)imino-1-ethyl-pyrrolidine;
2-[3-(p-fluorophenyl)-propyl]imino-1-ethyl-pyrrolidine; and
2-[3-(3,4-di-chlorophenyl)-propyl]imino-1-ethyl-pyrrolidine.

EXAMPLE IX

2-[(2',4'-Dimethoxyphenethyl)imino]-1-methyl-pyrrolidine perchlorate

Triethyloxonium fluoborate is prepared from 9.45 g. (0.0665 mole) of boron trifluoride etherate and 4.6 g. (0.0495 mole) of epichlorohydrin. The salt is washed with either by decantation and treated with a solution of 4.12 g. (0.0415 mole) of 1-methyl-2-pryyolidone in ether. After stirring at room temperature for 2.5 hours, the oily salt is washed with ether, dissolved in methylene chloride and treated with a solution of 7.5 g. (0.0415 mole) of 2,4-dimethoxyphenethylamine in methylene chloride. After stirring at room temperature overnight, the reaction mixture is washed with dilute sodium hydroxide, dried over anhydrous magnesium sulfate, filtered and concentrated to dryness in vacuo giving 2-[(2',4'-dimethoxyphenethyl)imino]-1-methyl-pyrrolidine which is dissolved in ethanol and treated with a solution of 5.35 g. of perchloric acid in ethanol. Dilution with ether and scratching afforded crystals which are collected by filtration and air-dried to give the perchlorate salt of 2-[(2',4'-dimethoxyphenethyl)imino]-1-methyl-pyrrolidine, m.p. 128.5°-131° C. After recrystallization from ethanol, the melting point is m.p. 129°-132° C.

Analysis: Calcd. for $C_{15}H_{22}N_2O_2 \cdot HClO_4$:
C, 49.65; H, 6.39; N, 7.72; Cl, 9.77%
Found: C, 49.66; H, 6.41; N, 7.85; Cl, 9.64%

EXAMPLE X

2-[(3',4'-Dimethoxy-α-methylphenethyl)imino]-1-methyl-pyrrolidine perchlorate

Triethyloxonium fluoborate is prepared from 5.55 g. (0.06 mole) of epichlorohydrin and 11.25 g. (0.08 mole) of boron trifluoride etherate. The salt is washed with ether and a solution of 4.95 g. (0.05 mole) of 1-methyl-2-pyrrolidone in ether is added. After stirring at room temperature for 3 hours, the salt is washed with ether, dissolved in methylene chloride and to it is added a solution of 9.75 g. (0.05 mole) of 3,4-dimethoxy-α-methylphenethylamine. After stirring at room temperature overnight, the solution is washed with dilute sodium hydroxide, dried over anhydrous magnesium sulfate, filtered and concentrated in vacuo giving an oily residue of crude 2-[(3',4'-dimethoxy-α-methylphenethyl)imino]-1-methylpyrrolidine which is suspended in dilute sodium hydroxide and extracted with benzene. The extracts are combined and dried over anhydrous magnesium sulfate, filtered and concentrated in vacuo to give the oily base once again which is dissolved in ethanol and converted to the perchlorate salt in the usual manner, m.p. 141°-144° C.

EXAMPLE XI

2-[(3',4'-Dichlorophenethyl)imino]-1-methyl-pyrrolidine cyclohexanesulfamate

Triethyloxonium fluoborate is prepared in ether from 5.55 g. (0.06 mole) of epichlorohydrin and 11.25 g. (0.08 mole) of boron trifluoride etherate. The salt is washed with ether by decantation and treated with a solution of 4.95 g. (0.05 mole) of 1-methyl-2-pyrrolidone in ether. The salt is washed with ether and dissolved in methylene chloride. 11.3 Grams (0.05 mole) of β-(3,4-dichlorophenyl)-ethylamine is dissolved in water, made basic with sodium hydroxide and extracted with methylene chloride. The extracts are combined and dried over anhydrous magnesium sulfate, filtered and concentrated to about 70 ml. and added dropwise to the methylene chloride solution of the pyrrolidinium fluoborate salt previously prepared. After stirring at room temperature overnight, the reaction solution is washed with dilute sodium hydroxide, dried over anhydrous magnesium sulfate, filtered and concentrated in vacuo, giving oily 2-[(3',4'-dichlorophenethyl)imino]-1-methyl-pyrrolidine which is dissolved in ether-dilute HCl and the layers separated. The ether solution is washed with dilute HCl and the combined acid extracts are washed with ether, made basic with sodium hydroxide and extracted with methylene chloride. After drying and evaporating to dryness there is obtained about 12 g. of oily 2-[(3',4'-dichlorophenethyl)imino]-1-methyl-pyrrolidine which is dissolved in acetone and treated with a solution of 8.1 g. (0.045 mole) of cyclohexylsulfamic acid in acetone. The solution is concentrated and diluted with ether. The resulting crystals of 2-[(3',4'-dichlorophenethyl)imino]-1-methyl-pyrrolidine cyclohexanesulfamate are cooled, collected by filtration and dried. After recrystallization from acetone-ether, the m.p. is 136°–141°C.

EXAMPLE XII

The procedure of Example X is repeated except that an equivalent quantity each of 3,4-dichloro-α-methylphenethylamine and p-bromo-α-methylphenethylamine is substituted for the 3,4-dimethoxy-α-methylphenethylamine used therein to yield, as respective products 2-[(3',4'-dichloro-α-methyl-phenethyl)imino]-1-methyl-pyrrolidine and 2-[(p-bromo-α-methylphenethyl)imino]-1-methyl-pyrrolidine in the form of a perchlorate salt.

EXAMPLE XIII

2-[(3',4'-Methylenedioxyphenethyl)imino]-1-methyl-pyrrolidine perchlorate

Triethyloxonium fluoborate is prepared in ether from 5.55 g. (0.06 mole) of epichlorohydrin and 11.25 g. (0.08 mole) of boron trifluoride etherate. The salt is washed with ether by decantation and to it is added a solution of 4.95 g. (0.05 mole) of 1-methyl-2-pyrrolidone in ether. After stirring for two hours, the salt is washed with ether by decantation and dissolved in methylene chloride. To it is added a solution of 8.25 g. (0.05 mole) of 3,4-methylenedioxy-β-phenethylamine in methylene chloride. The reaction mixture is stirred for 2 hours at room temperature and allowed to stand overnight. The solution is then washed with dilute sodium hydroxide, dried over magnesium sulfate, filtered, and concentrated to dryness in vacuo, giving oily 2-[(3',4'-methylenedioxyphenethyl)imino]-1-methyl-pyrrolidine which is dissolved in acetone and treated with 6.75 g. of perchloric acid. Dilution with ether yields crystals of the corresponding perchlorate salt, m.p. 133°–136°C. Recrystallization from acetone raises the m.p. to 136°–140°C.

EXAMPLE XIV

2-[(p-Methoxyphenethyl)imino]-1-methyl-pyrrolidine cyclohexanesulfamate is obtained by repeating the procedure of Example XV, except that an equivalent amount of β-(p-methoxy-phenyl)-ethylamine is employed in place of the dichlorophenethyl-amine used therein, m.p. 107°–112 °C.

EXAMPLE XV

2-[(m-Methoxyphenethyl)imino]-1-methyl-pyrrolidone perchlorate is obtained by following the procedure of Example XI, except that an equivalent amount of 1-methyl-2-pyrrolidone is used in place of 1-ethyl-2-pyrrolidone and an equivalent amount of β-m-methoxyphenethylamine is used in place of the dimethoxyphenethylamine used therein, m.p. 101°–103 °C. (free base distills at 130°–135°C./0.3mm. Hg.).

EXAMPLE XVI

2-[(3',4'-Dimethoxybenzyl)imino]-1-methylpyrrolidine perchlorate hemihydrate

A solution of 5.55 g. (0.06 mole) of epichlorohydrin in ether is added dropwise with stirring to a solution of 11.25 g. (0.08 mole) of boron trifluoride etherate in ether. After stirring for 2 hours, the oily salt is washed with ether by decantation, dissolved in methylene chloride and treated with a solution of 4.95 g. (0.05 mole) of 1-methyl-2-pyrrolidone in methylene chloride. After stirring for 2 hours, a solution of 8.36 g. (0.05 mole) of veratrylamine in methylene chloride is added. After stirring at room temperature overnight, the solution is washed with dilute sodium hydroxide, dried over magnesium sulfate, filtered and concentrated to dryness in vacuo, affording the crude oily base, 2-[(3',4'-dimethoxybenzyl)imino]-1-methyl-pyrrolidine. An acid-base separation affords the oily base which is distilled at 141°–145°C./0.1-0.05 mm. Hg. A solution of the latter in ethanol is treated with a solution of 3.86 g. of 70 percent perchloric acid in ethanol. Cooling and scratching yields crystals of 2-[(3',4'-dimethoxybenzyl)imino]-1-methylpyrrolidine perchlorate hemihydrate which are collected and recrystallized from ethanol (charcoaled), m.p. 135°–138°C.

EXAMPLE XVII

2-[(3',4'-Dimethoxyphenethyl)imino]-1-n-butyl-pyrrolidine cyclohexanesulfamate 1-n-Butyl-2-pyrrolidone (14.12 g., 0.1 mole) is dissolved in 25 ml. of benzene and cooled in a water bath. To this solution is added, with stirring 15.2 g. (0.1 mole) of phosphorous oxychloride and after refluxing for 10 minutes, the reaction mixture is cooled to room temperature. A solution of 18.12 g. (0.1 mole) of β-3,4-dimethoxyphenethylamine in 25 ml. of benzene is added dropwise with stirring to the above solution (water bath cooling continued). A slurry forms but dissolves with heating. The reaction mixture is refluxed for two hours; cooled to room temperature and poured onto 100 ml. of water containing 4.0 g. (0.1 mole) of NaOH. The resulting gel is extracted with benzene (four × 100 ml.). The extracts are combined and dried over anhydrous MgSO$_4$ and evaporated in vacuo leaving an oily residue. After acid-base purification, the product is extracted into ether (4 × 100 ml.). The combined extracts are dried over anhydrous MgSO$_4$ and evaporated in vacuo leaving an oily residue which is dissolved in acetone. An equivalent amount of cyclohexylsulfamic acid dissolved in acetone is added. Cooling and scratching affords the crude product, 2-[(3',4'-dimethoxyphenethyl)imino]-1-n-butylpyrrolidine cyclohexanesulfamate, m.p. 92°–95.5°C. Recrystallization from acetone gives the pure product, m.p. 95°–97°C.

EXAMPLE XVIII

2-[(3',4'-Diethoxyphehethyl)imino]-1-methylpyrrolidine cyclohexanesulfamate

To 0.06 mole of triethyloxonium fluoborate [prepared by the method of Meerwein et al., Ann., 641, 1 (1961)] in ether is added 5.95 g. (0.06 mole) of 1-methyl-2-pyrrolidone in 30 ml. of dry ether. After stirring under dry nitrogen for 3 hours at room temperature, the resulting oil is washed by decantation (4 × 50·75 ml. of dry ether), dissolved in methylene chloride and treated with 10.46 g. (0.05 mole) of β-3,4-diethoxyphenethylamine in 30 ml. of methylene chloride. The reaction mixture is stirred overnight at room temperature under an atmosphere of dry nitrogen. The reaction mixture is washed with dilute NaOh (10%) (2 × 75 ml.). Extraction of the product into dilute HCl (10%) followed by basification with excess NaOh (50%) and ether extraction gives after drying (MgSO$_4$) and solvent removal in vacuo, about 9.5 g. of oily 2-[(3',4'-diethoxyphenethyl)-imino]-1 -methylpyrrolidine. An acetone solution of the oil is treated with 5.9 g. (0.0327 mole) of cyclohexanesulfamic acid in acetone. Cooling and scratching gives the crude salt, 2-[(3',4'-diethoxyphenethyl)imino]-1-methylpyrrolidine cyclohexanesulfamate. Recrystallization from acetone-ether and acetone affords the pure salt; m.p. 94.5°–96.5°C.

EXAMPLE XIX

2-[(3',4'-Diethoxyphenethyl)imino]-1-methylpyrrolidine cyclohexanesulfamate may be also prepared by refluxing 3.15 g. (0.01 mole) of the product of Example XXIX with 4.68 g. (0.03 mole) of ethyl iodide while adding dropwise 6 ml. (0.03 mole) of aqueous 5N NaOH. After the addition is complete, refluxing is continued for two hours. Conventional workup and the conversion to the cyclohexanesulfamate salt gives the desired product.

EXAMPLE XX

2-[(3',4'-Dihydroxyphenethyl)imino]-1-methylpyrrolidine hydrobromide

Five Grams (0.013 mole) of oily 2-[(3',4'-dimethyoxy-phenethyl)imino]-1-methyl-2-pyrrolidone is dissolved in methylene chloride, cooled to −70°C. and treated with a methylene chloride solution of 2.8 g. (0.013 mole) of boron tribromide. The reaction is then allowed to warm to room temperature and stirred for 4 hours (total). The solution is concentrated in vacuo; the residue is dissolved in methanol, concentrated in vacuo, dissolved in water and concentrated in vacuo. The addition of methanol and ether affords crystals of 2-[(3',4'-dihydroxyphenethyl)imino]-1-methylpyrrolidine hydrobromide which are recrystallized from methanol ether to give the product as an off-white solid.

EXAMPLE XXI

2-[(3',4'-Dihydroxyphenethyl)imino]-1-methylpyrrolidineHBr

A solution of 34.35 g. (0.09 mole) of 2-[(3',4'-dimethoxyphenethyl)imino]-1-methylpyrrolidine is refluxed with 68.7 ml. of 48 percent HBr and 68.7 ml. of glacial acetic acid for 22 hours. Cooling to room temperature affords an impure crop which is removed by filtration. Cooling of the mother liquor in an ice bath affords 2-[(3',4'-dihydroxyphenethyl)imino]-1-methylpyrrolidine HBr as crystals, m.p. 215°–216.5°C.

EXAMPLE XXII

1-Methyl-2-[(3,4-dimethoxyphenethyl)imino]-pyrrolidine may be also prepared by refluxing an ethanolic solution of 2-[(3',4'-dihydroxyphenethyl)imino]-1-methyl-pyrrolidine with two equivalents of methyl iodide while adding dropwise an aqueous solution of sodium hydroxide (3 equivalents). Conventional acid-base extraction and conversion to the cyclohexanesulfamate salt gives the desired product.

EXAMPLE XXIII

2-[3-(3,4-Dimethoxyphenyl)propylimino-1-methyl-pyrrolidine hydrochloride: To 6.85 g. (0.0691 mole) of N-methyl-2-pyrrolidinone in 25 ml. of dry benzene is added 10.6 g. (0.0691 mole) of phosphorous oxychloride dropwise with stirring at 25°C. (water bath). After the addition is complete, the mixture is heated under reflux for 5 min., cooled to room temperature and a solution of 13.5 g. (0.0691 mole) of 3-(3,4-dimethoxyphenyl)propylamine in 25 ml. of benzene is added (stirring and cooling). After refluxing the mixture for 2.5 hours, the reaction mixture is cooled and poured into ice-water containing 2.76 g. (0.069 mole) of sodium hydroxide. After the pH of the water solvent becomes acidic, the benzene layer is discarded. The aqueous layer is made strongly alkaline and the oil is extracted into ether (3 × 150 ml.). The combined ether layers are dried over anhydrous MgSO$_4$ and the solvent is removed in vacuo yielding about 13.5 g. of oil (70.6 percent). The oil is dissolved in dry ether and treated with excess ethereal HCl The oily salt upon trituration with acetone and scratching afforded crystals. Recrystallization from absolute ethanol (minimum)-acetone yields about 6.87 g. (31.7 percent) of 2-[3-(3,4-Dimethoxyphenyl)propylimino-1-methyl-pyrrolidine hydrochloride], m.p. 151°–154°C.

Anal. Calcd. for $C_{16}H_{24}N_2O_3 \cdot HCl$ C, 61.43; H, 8.06; N, 8.96%.

Found: C, 61.41; H, 8.04; N, 9.03%.

EXAMPLE XXIV 2-(2,6-Dichlorobenzyl)imino-1-methylpyrrolidine: The procedure of Example XXIII is repeated except that an equivalent quantity of 2,6-dichlorobenzylamine is used in place of the 3-(3,4-dimethoxyphenyl)propylamine used therein to yield the product, 2-(2,6-dichlorobenzyl)imino-1-methyl-pyrrolidine hydrochloride. Alkaline workup followed by acid-base extraction gives the free base as a crystalline solid, m.p. 88°–92C. Recrystallization from ether-pet.ether yields about 6.2 g. (48%) of pure product, m.p. 91°–92.5°C.

Anal. Calcd. for $C_{12}H_{14}Cl_2N_2$(257.17): C, 56.04; H, 5.48; N, 10.89%.

Found: C, 56.09; H, 5.58; N, 11.11%.

EXAMPLE XXV

2-[(3,4-Dimethoxyphenethyl)imino]-1octylpyrrolidine saccharinate: Triethyloxonium fluoborate is prepared by adding 5.55 g. (0.06 mole) of epichlorohydrin dropwise to a solution of 11.35 g.

(0.08 mole) of borontrifluoride etherate in 50 ml. of anhydrous ether under nitrogen. This is vigorously stirred at room temperature for 2 hours. After washing the resulting salt with dry ether by decantation, 9.87 g. (0.05 mole) of N-octylpyrrolidone in anhydrous ether is added dropwise with stirring. After four hours, a slight pink color is observed. An oil separates which is washed with dry ether by decantation. After dissolving this oil in methylene chloride (dried), 9.06 g. (0.05 mole) of 3,4-dimethoxyphenethylamine dissolved in methylene chloride is added dropwise with constant stirring. Stirring is continued at room temperature overnight and the reaction mixture turns yellow. After washing the reaction mixture twice with 10 percent NaOH and drying it over $K_2CO_3$, it is taken to dryness in vacuo. The resulting residue is dissolved in ether and washed 3 times (25 mls. each) with 10 percent HCl and the acid layer is made strongly alkaline with 10 percent NaOH and extracted into ether (4 × 50 mls.). After drying over $K_2CO_3$ and evaporation in vacuo, a 16.5 g. residue containing 2-[(3,4-dimethoxyphenethyl)imino]-1-n-octylpyrrolidine (91.7 percent crude yield) is obtained. The saccharinate salt is prepared by adding 8.25 g. (0.045 mole) of saccharin dissolved in acetone to an acetone solution of 16.2 g. (0.045 mole) of the above residue. After cooling and scratching, a solid is collected; m.p. 90°–93°C. Repeated recrystallizations from ethylacetate gives the pure product; m.p. 96°–98°C.

Anal. Calcd. for $C_{22}H_{36}N_2O_2 \cdot C_7H_5NO_3S$: C, 64.06; H, 7.60%.

Found: C, 64.15; H, 7.56%.

EXAMPLE XXVI 2-(2,6-Dichlorophenethyl)imino-1-methylpyrrolidine HCl: 6.9 Grams (0.07 mole) of N-methyl-2-pyrrolidone and 10.7 grams (0.07 mole) of phosphorous oxychloride are mixed together in 100 ml. of benzene and the mixture is refluxed for ½ hour with stirring. The yellow, cloudy mixture is cooled to room temperature and 16 grams (0.07 mole) of 2-(2,6-dichlorophenyl)-ethylamine hydrochloride are added. The reaction mixture is refluxed for 16 hours with stirring, then colled, and poured into an 800 ml. beaker full of ice. The mixture is brought to pH 14 with 50 percent NaOH solution and extracted several times with benzene, ether and chloroform. The combined organic extracts are dried over $Na_2SO_4$, filtered and the organic solvents are removed under reduced pressure. The residual oil is taken up in ether and anhydrous HCl is passed through the solution until the heavy, white precipitate stops forming. The precipitate is filtered off and dissolved in 600 ml. of acetone containing 50 ml. of isopropyl alcohol. The solution is filtered and 300 ml. ether are added. After cooling, HCl crystals are collected and dried over $P_2O_5$ at 60°C. for 24 hours to yield about 16.4 grams (76 percent yield) of product, 2-(2,6-dichlorophenethyl)imino-1-methylpyrrolidine HCl, m.p. 218°–220°C. (Dec).

Anal. Calcd. for $C_{13}H_{16}N_2Cl_2 \cdot HCl$: C, 50.75; H, 5.57; N, 9.11%.

Found: C, 50.99; H, 5.56; N, 9.25%.

What is claimed is:

1. A chemical compound selected from the group consisting of a 2-aralkylimino-pyrrolidine having the formula:

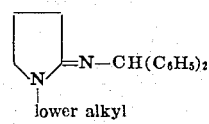

and the therapeutically active acid addition salts thereof.

2. The compound of claim 1 which is 1-methyl-2-[(1,1-diphenylmethyl)imino]pyrrolidine.

3. A chemical compound selected from the group consisting of a 2-imino-pyrrolidine having the formula:

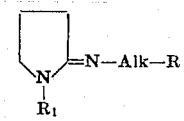

and the therapeutically active acid addition salts thereof, wherein Alk is a saturated alkylene having one to three carbon atoms; R is a member selected from the group consisting of mono-, di- and tri-substituted phenyl and methylenedioxyphenyl, each substituent of said substituted phenyls being a member selected from the group consisting of halo, lower alkoxy and hydroxy; and $R_1$ is lower alkyl.

4. The compound of claim 3 which is 1-methyl-2-(p-chlorobenzylimino)pyrrolidine.

5. 2-[(3',4'-Dihydroxyphenethyl)imino]-1-methyl-pyrrolidine.

6. 2-[3-(3,4-Dimethoxyphenyl)propylimino]-1-methyl-pyrrolidine.

7. 2-(2,6-Dichlorobenzyl)imino-1-methylpyrrolidine.

8. 2-[(3,4-Dimethoxyphenethyl)imino]-1-n-octylpyrrolidine.

9. 2-(2,6-Dichlorophenethyl)imino-1-methylpyrrolidine.

10. 1-Lower alkyl-2-[(di-lower alkoxyphenethyl)imino]-pyrrolidine.

11. 1-Methyl-2-[(3,4-dimethoxyphenethyl)imino]-pyrrolidine.

12. 2-[(3',4'-Dimethoxyphenethyl)imino]-1-ethyl-pyrrolidine.

13. 2-[(2',4'-Dimethoxyphenethyl)imino]-1-methyl-pyrrolidine.

14. 2-[(3',4'-Dimethoxy-α-methylphenethyl)imino]-1-methylpyrrolidine.

15. 2-[(3',4'-Dichlorophenethyl)imino]-1-methyl-pyrrolidine.

16. 2-[(3',4'-Methylenedioxyphenethyl)imino]-1-methyl-pyrrolidine.

17. 2-[(p-Methoxyphenethyl)imino]-1-methyl-pyrrolidine.

18. 2-[(m-Methoxyphenethyl)imino]-1-methyl-pyrrolidone.

19. 2-[(3',4'-Dimethoxybenzyl)imino]-1-methyl-pyrrolidine.

20. 2-[(3',4'-Dimethoxyphenethyl)imino]-1-n-butyl-pyrrolidine.

21. 2-[(3',4'-Diethoxyphenethyl)imino]-1-methyl-pyrrolidine.

* * * * *